United States Patent
Matich et al.

(10) Patent No.: US 7,121,780 B2
(45) Date of Patent: Oct. 17, 2006

(54) MULTIPLE LOAD PATH FASTENER SYSTEMS

(75) Inventors: Charles B. Matich, Seattle, WA (US); Steven L. Schwark, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/971,987

(22) Filed: Oct. 21, 2004

(65) Prior Publication Data

US 2006/0088400 A1  Apr. 27, 2006

(51) Int. Cl.
  *F16B 33/00* (2006.01)
(52) U.S. Cl. .................................... 411/367
(58) Field of Classification Search ............... 411/367, 411/383–385, 366.1, 395, 338, 546; 403/408.1
See application file for complete search history.

(56) References Cited

U.S. PATENT DOCUMENTS

| | | | | |
|---|---|---|---|---|
| 2,359,046 | A * | 9/1944 | Miller | 411/368 |
| 3,179,143 | A * | 4/1965 | Schultz et al. | 411/82.2 |
| 3,602,976 | A * | 9/1971 | Grube | 29/407.03 |
| 4,063,831 | A * | 12/1977 | Meuret | 403/28 |
| 4,075,923 | A * | 2/1978 | Latham | 411/378 |
| 4,102,036 | A * | 7/1978 | Salter | 29/525 |
| 4,108,407 | A * | 8/1978 | Cable et al. | 248/656 |
| 4,435,100 | A * | 3/1984 | Cox | 403/27 |
| 4,444,365 | A * | 4/1984 | Heuberger | 244/48 |
| 4,762,450 | A * | 8/1988 | Schwind et al. | 411/34 |
| 4,844,418 | A * | 7/1989 | Cole | 254/29 A |
| 5,137,408 | A * | 8/1992 | Junkers | 411/432 |
| 5,275,529 | A * | 1/1994 | Langenbrunner et al. | 415/119 |
| 5,328,312 | A * | 7/1994 | Driscoll | 403/11 |
| 5,690,456 | A * | 11/1997 | Wedellsborg | 411/383 |
| 5,860,778 | A * | 1/1999 | Keener | 411/5 |
| 6,488,459 | B1 | 12/2002 | Carpenter | |
| 6,601,277 | B1 * | 8/2003 | Swanson | 29/256 |
| 2003/0175113 | A1 * | 9/2003 | Miwata et al. | 415/90 |

OTHER PUBLICATIONS

IB6, Scale:2/1 (1 pg); Sep. 30, 1987.

* cited by examiner

*Primary Examiner*—Robert J. Sandy
*Assistant Examiner*—Jeffrey A. Sharp
(74) *Attorney, Agent, or Firm*—Perkins Coie LLP

(57) ABSTRACT

Dual load path fastener systems, and methods for their use, are described herein. In one embodiment, a dual load path fastener system includes first and second fasteners. The first fastener has a first end portion, a second end portion spaced apart from the first end portion, and a hole extending through the first and second end portions. The second fastener is configured to extend through the hole in the first fastener with a third end portion of the second fastener protruding beyond the first end portion of the first fastener and a fourth end portion of the second fastener protruding beyond the second end portion of the first fastener. The fastener system of this embodiment further includes a spacer portion configured to support the third end portion of the second fastener in such a way that the third end portion is longitudinally supported independently of the first fastener.

17 Claims, 3 Drawing Sheets

MULTIPLE LOAD PATH FASTENER SYSTEMS

TECHNICAL FIELD

The following disclosure relates generally to mechanical fasteners and, more particularly, to mechanical fastener systems that can provide redundant load paths at a single connection point.

BACKGROUND

Various types of mechanical fasteners are known for connecting parts together. Nut and bolt combinations are typically used when high strength and/or disassembly is required. Under certain circumstances, however, even high-strength nut and bolt combinations can fail. Such failure can occur, for example, because of material defects, corrosion, fatigue, stress, etc.

In a typical joint having one or more bolts, each bolt provides a single load path at its location. Consequently, bolt failure at one location can result in a total loss of strength at that particular location, which in turn can cause undesirable load redistribution. To avoid single-point failures, dual load path fastener systems can be used in those applications where structural redundancy is required.

FIG. 1 is a cross-sectional side view of one type of dual load path fastener system 100 ("fastener system 100") configured in accordance with the prior art. The fastener system 100 includes an outer bolt 110 extending through a first part 101 and a second part 102. The outer bolt 110 threadably engages a nut 127. Tightening the nut 127 puts the outer bolt 110 in tension and clamps the first part 101 to the second part 102.

The fastener system 100 further includes an inner bolt 120 extending through a hole 121 in the outer bolt 110. The inner bolt 120 engages internal threads 116 in a first head portion 112 of the outer bolt 110. Tightening the inner bolt 120 puts it in tension and compresses a flange of a cap 118 between a tip portion 113 of the outer bolt 110 and a second head portion 122 of the inner bolt 120.

If the outer bolt 110 fails in shear, the inner bolt 120 will carry the load, thereby providing a redundant load path or "fail-safe" feature in shear. If the outer bolt 110 or the nut 127 fails in tension, however, the inner bolt 120 may not carry the load. Thus, the fastener system 100 may be "zero failure tolerant" in these failure modes. For example, if the nut 127 fails, this will—at the very least—result in a loss of preload at the bolt location. Similarly, if the first head portion 112 of the outer bolt 110 fails, this will also result in a loss of preload—if not a total loss of tension capability—at this location. Loss of preload can have a number of negative consequences, including load redistribution to adjacent fasteners. This can overload the adjacent fasteners and/or the mating parts, ultimately leading to part or system failure.

SUMMARY

The present invention is directed generally toward dual load path fastener systems and methods for their use. A fastener system configured in accordance with one aspect of the invention includes a first fastener, a second fastener, and a spacer portion. The first fastener has a first end portion, a second end portion spaced apart from the first end portion, and a hole extending through the first end portion and the second end portion. The second fastener is configured to extend through the hole in the first fastener. In this position, a third end portion of the second fastener protrudes beyond the first end portion of the first fastener, and a fourth end portion of the second fastener protrudes beyond the second end portion of the first fastener. The spacer portion is configured to support the third end portion of the second fastener independently of the first fastener. In one embodiment, for example, the first end portion of the first fastener can include a head portion and the spacer portion can be configured to form at least part of a bridge extending over the head portion. In another embodiment, the spacer portion can be configured to form at least part of a dome extending over the head portion.

An assembly configured in accordance with another aspect of the invention includes a first part having a first through-hole, a second part having a second through-hole, and a first fastener extending through the first and second through-holes and pressing the first and second parts together. The assembly further includes a second fastener extending through a third through-hole in the first fastener. The second fastener presses the first and second parts together independently of the first fastener.

A method for attaching a first part to a second part in accordance with a further aspect of the invention includes inserting a first fastener through a first hole in the first part and a second hole in the second part. The method further includes placing the first fastener in tension to press the first part against the second part. The method additionally includes inserting a second fastener through a third hole in the first fastener, and placing the second fastener in tension to press the first part against the second part independently of the first fastener.

DETAILED DESCRIPTION

The following disclosure describes dual load path fastener systems and various methods for their use. Certain details are set forth in the following description and in FIGS. 2 and 3 to provide a thorough understanding of various embodiments of the invention. Other details describing well-known structures and systems often associated with fasteners and fastener systems, however, are not set forth to avoid unnecessarily obscuring the description of the various embodiments of the invention.

Many of the details, dimensions, angles, and other features shown in the Figures are merely illustrative of particular embodiments of the invention. Accordingly, other embodiments can have other details, dimensions, angles, and features without departing from the spirit or scope of the present invention. In addition, further embodiments can be practiced without several of the details described below.

In the Figures, identical reference numbers identify identical, or at least generally similar, elements. To facilitate the discussion of any particular element, the most significant digit or digits of any reference number refer to the Figure in which that element is first introduced. For example, element 210 is first introduced and discussed with reference to FIG. 2.

Figure 2:
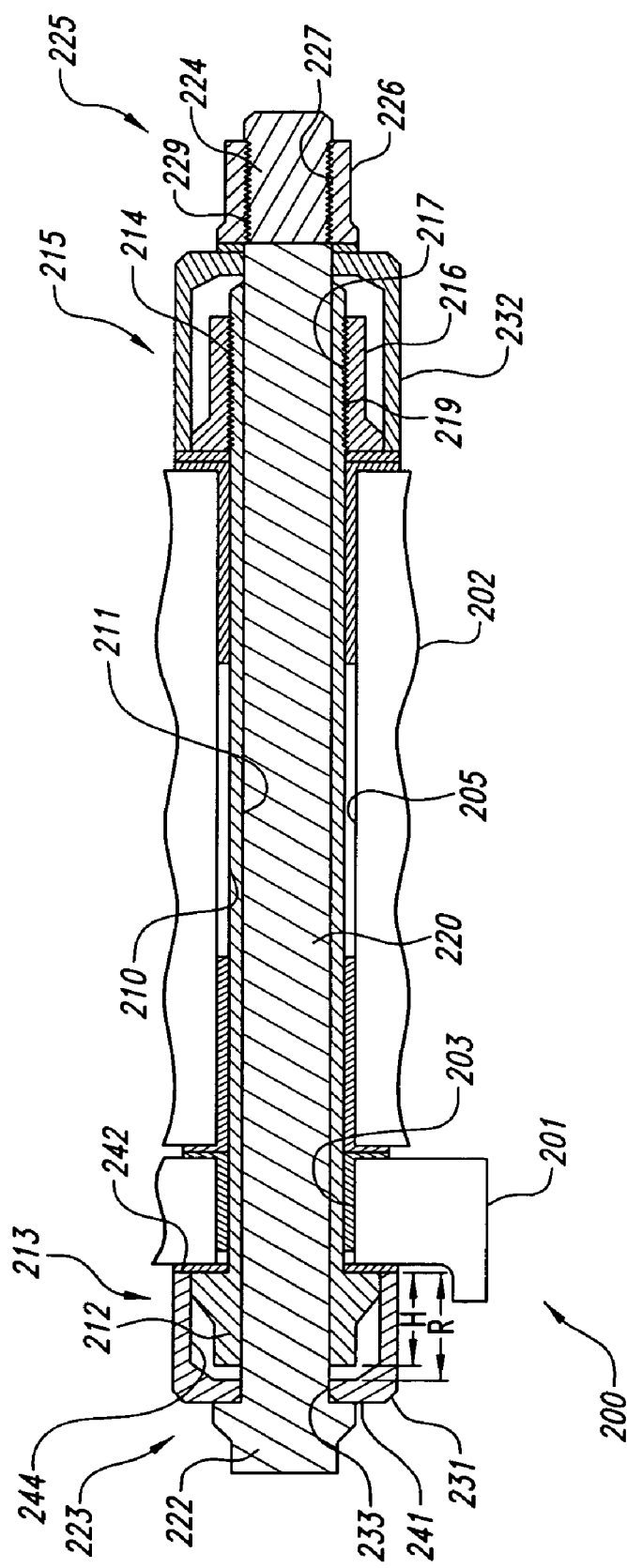
FIG. 2 is a cross-sectional side view of a dual load path fastener system configured in accordance with an embodiment of the invention.

FIG. 2 is a cross-sectional side view of a dual load path fastener system 200 ("fastener system 200") configured in accordance with an embodiment of the invention. In one aspect of this embodiment, the fastener system 200 includes a first fastener 210 extending through a first part 201 and a second part 202. The first fastener 210 can include a first head portion 212 toward a first end 213, a first engagement portion 214 toward a second end 215, and a hole 211 extending longitudinally from the first end 213 to the second end 215. The first engagement portion 214 can be configured to engage a first locking element 216. In the illustrated embodiment, for example, the first locking element 216 can represent a nut or similar device having a plurality of internal threads 217 that engage corresponding external threads 219 on the first engagement portion 214. In other embodiments, other types of locking elements can be used to engage the first engagement portion 214 of the first fastener 210. Such locking elements can include, for example, collars or other devices that are swaged and/or pressed onto the first engagement portion 214 rather than threaded on.

In another aspect of this embodiment, the fastener system 200 further includes a second fastener 220 that extends longitudinally through a hole 221 in the first fastener 210. The second fastener 220 can include a second head portion 222 toward a third end 223, and a second engagement portion 224 toward a fourth end 225. The second engagement portion 224 can engage a second locking element 226. As described above for the first fastener 210, in one embodiment the second locking element 226 can represent a nut or similar device having a plurality of internal threads 227 that engage corresponding external threads 229 on the second engagement portion 224. In other embodiments, the second locking element 226 can include other locking features.

In a further aspect of this embodiment, the fastener system 200 additionally includes a first spacer 231 positioned under the second head portion 222, and a second spacer 232 positioned under the second locking element 226. The two spacers can be at least generally similar in structure and function. Referring to the first spacer 231 for ease of illustration, the first spacer 231 includes an aperture 233 positioned proximate to a first surface portion 241, and a recess 244 positioned proximate to a second surface portion 242. The aperture 233 is configured to allow the second engagement portion 224 of the second fastener 220 to pass through the first spacer 231. The recess 244 is configured to receive the first head portion 212 of the first fastener 210 with clearance in the longitudinal direction. In this regard, the recess 244 can have an overall height dimension R and, by comparison, the first head portion 212 can have an overall height dimension H which is less than R.

To attach the first part 201 to the second part 202 with the fastener system 200, the first fastener 210 is inserted through a first hole 203 in the first part 201 and a second hole 205 in the second part 202. The first locking element 216 is then engaged with the first engagement portion 214 and tightened to clamp the first part 201 to the second part 202. Next, the second fastener 220 is inserted through the aperture 233 in the first spacer 231 and the hole 211 in the first fastener 210. The second spacer portion 232 can then be placed over the second engagement portion 224 of the second fastener 220, and the second locking element 226 can be engaged with the second engagement portion 224.

Tightening the second locking element 226 places a tension load on the second fastener 220 that compresses the first part 201 against the second part 202 independently of the first fastener 210. Specifically, the first spacer 231 forms a dome or bridge-type structure that carries this tension load over the first head portion 212 and brings it to bear against the first part 201. The second spacer portion 232 functions in a similar manner to carry the tension load over the second locking element 226 and bring it to bear against the second part 202.

Although the first spacer 231 and the second fastener 220 are illustrated in FIG. 2 as being two separate parts, in other embodiments, the first spacer 231 can be formed as an integral portion of the first head portion 222 of the second fastener 220. Similarly, in further embodiments, the second spacer 232 can be formed as an integral portion of the second locking element 226. Such "one-piece" constructions may be advantageous for reducing part count in certain embodiments.

Figure 1:
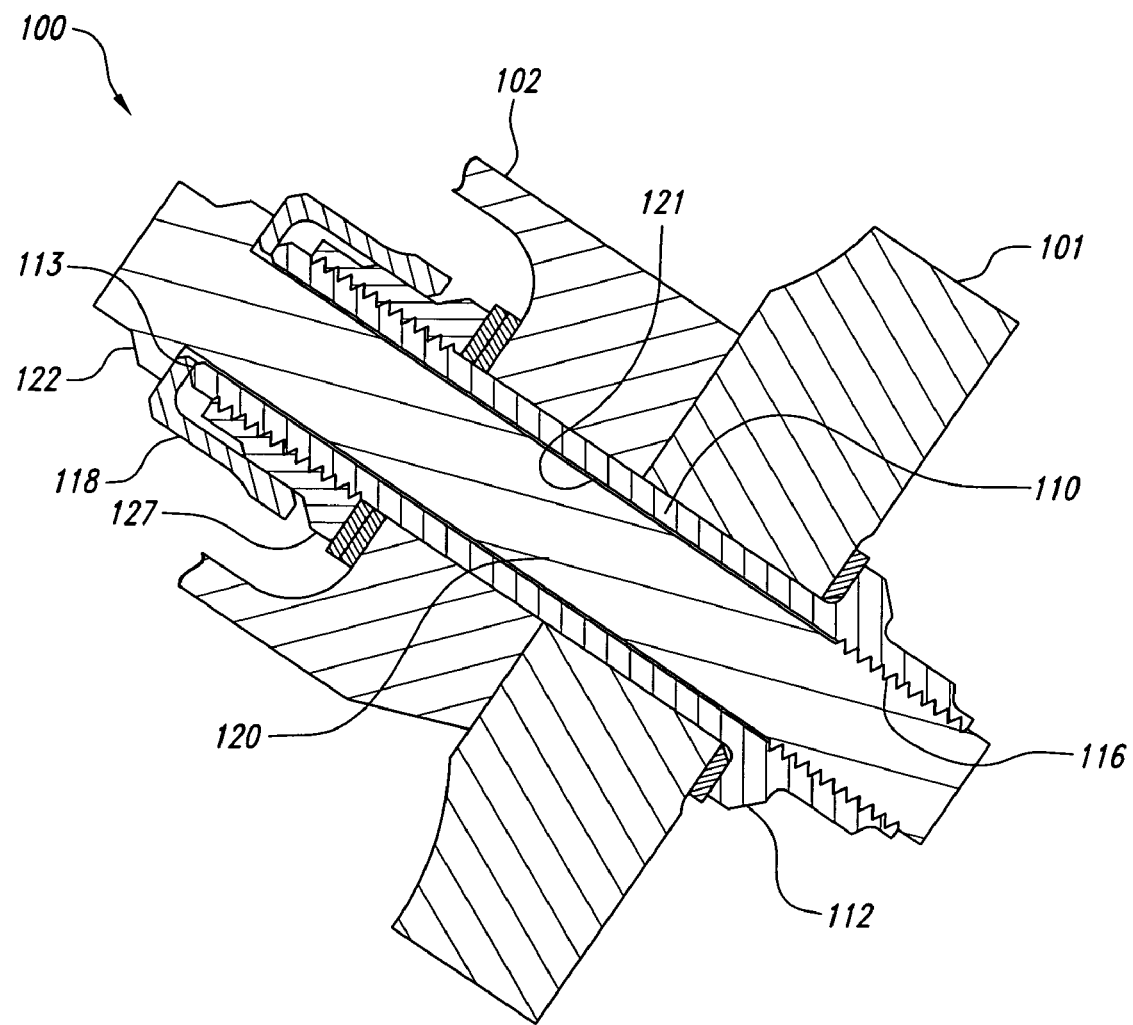
FIG. 1 is a cross-sectional side view of a fastener system configured in accordance with the prior art.

One feature of the embodiment of the fastener system 200 described above is that if any part of the first fastener 210 or the first locking element 216 fails in tension, then the second fastener 220 can maintain full preload and/or full tension capability across the joint. An advantage of this feature is that it translates to complete redundancy, i.e., redundancy in both tension and shear, across the joint. Another feature of this embodiment is that the full tension load in the second fastener 220 is reacted by compression of the first part 201 against the second part 202, in contrast to the prior art fastener system 100 described above with reference to FIG. 1 in which most, if not all, of the tension load in the inner bolt 120 is reacted by compression of the outer bolt 110. An advantage of this feature is that it allows the preload across the joint to be tightly controlled, even in failure mode scenarios.

The various parts of the fastener system 200 described above can be manufactured from a wide range of known materials depending on the particular application. Factors typically influencing choice of materials include structural properties (e.g., strength, stiffness, corrosion resistance, etc.), cost, and weight to name a few. In one embodiment, the fasteners, locking elements, and spacer portions described above can be manufactured from Inconel®, such as Inconel® 718, or a similar high-strength steel. In other embodiments, these parts can be manufactured from various types of corrosion-resistant stainless steel, or from a nickel-cobalt material such as MP35N. In further embodiments, one or more of these parts can be manufactured from various types of titanium, aluminum and/or other high-strength alloys. In addition, it is expected that these parts can also be manufactured from one or more suitable non-metallic materials, including ceramic or composite materials. Accordingly, the fastener systems of the present invention are not limited to a particular type of material.

Figure 3:
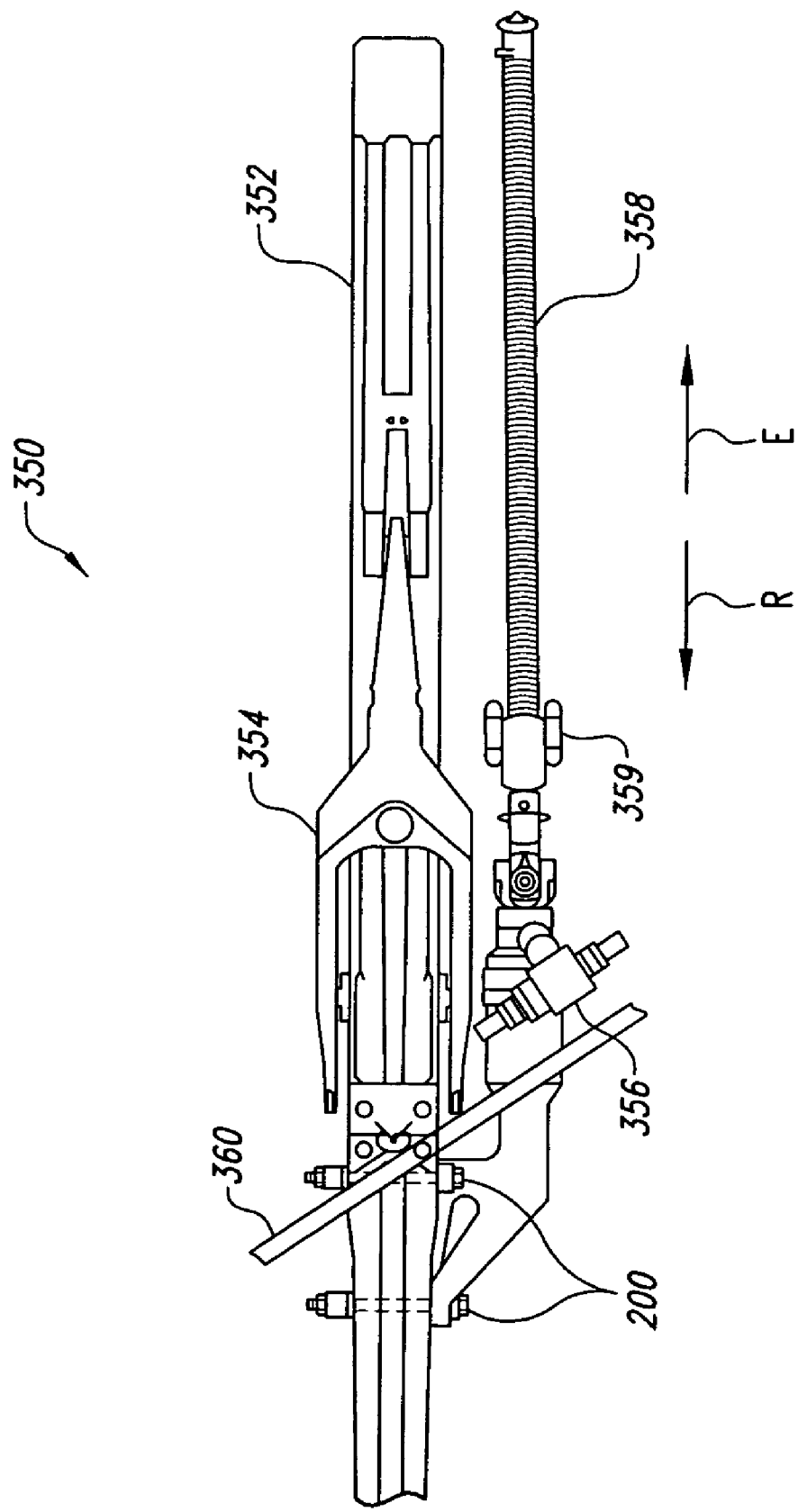
FIG. 3 is a top view of an aircraft flap assembly using the fastener system of FIG. 2.

FIG. 3 is a top view of a portion of an aircraft trailing edge flap assembly 350 ("flap assembly 350") configured in accordance with an embodiment of the invention. In one aspect of this embodiment, the flap assembly 350 includes a flap track 352 extending rearward proximate to a wing trailing edge spar 360. A flap carriage 354 configured to support a trailing edge flap (not shown) is movably coupled to the flap track 352. The flap carriage 354 is configured to move on the flap track 352 in an extend direction E as the flap extends and in a retract direction R as the flap retracts.

In another aspect of this embodiment, a flap transmission 356 is fixedly attached to the flap track 352 by a plurality of the fastener systems 200 described above with reference to FIG. 2. The flap transmission 356 is configured to convert hydraulic power from an aircraft hydraulic system (not shown) into shaft power for selectively rotating a ball screw 358. A fitting 359 is threadably engaged with the ball screw 358 and is operably coupled to the trailing edge flap. As the ball screw 358 rotates in a first direction, the fitting 359 travels in the E direction extending the trailing edge flap. Conversely, when the ball screw 358 rotates in the opposite direction, the fitting 359 travels in the R direction and retracts the trailing edge flap.

One feature of the embodiment illustrated in FIG. 3 is that each of the fastener systems 200 attaching the flap transmission 356 to the flap track 352 provides a redundant, single-failure tolerant load path at its location. For example, if the first fastener 210 (FIG. 2) of one of the fastener systems 200 happens to fail during service, the second fastener 220 can still provide preload and carry the full load at the particular fastener location. An advantage of this feature is that a single part failure in one of the fastener systems 200 will not result in undesirable load redistribution at the joint.

The flap assembly 350 described above is but one example of a structural assembly that can utilize the fastener systems 200. Accordingly, use of the fastener systems 200 is not limited to this particular application. To the contrary, the fastener systems 200 can be used in myriad other applications including, but not limited to, applications in which structural redundancy is desired or required.

From the foregoing, it will be appreciated that specific embodiments of the invention have been described herein for purposes of illustration, but that various modifications may be made without deviating from the spirit and scope of the invention. For example, aspects of the invention described in the context of particular embodiments may be combined or eliminated in other embodiments. Further, while advantages associated with certain embodiments of the invention have been described in the context of those embodiments, other embodiments may also exhibit such advantages, and no embodiment need necessarily exhibit such advantages to fall within the scope of the invention. Accordingly, the invention is not limited, except as by the appended claims.

The invention claimed is:

1. An assembly comprising:
    a first part having a first through-hole;
    a second part having a second through-hole;
    a first fastener having a third through-hole, the first fastener extending through the first and second through-holes and pressing the first and second parts together;
    a second fastener extending through the third through-hole in the first fastener; and
    a means for preventing an axial load in the second fastener pressing the first and second parts together from being carried by any portion of the first fastener or by any third part engaged with the first fastener.

2. The assembly of claim 1 wherein the first fastener further includes a head portion toward a first end and an engagement portion toward a second end, and wherein the assembly further comprises a locking element engaging the engagement portion of the first fastener to press the first and second parts together.

3. The assembly of claim 1 wherein the first fastener further includes a head portion toward a first end and a threaded portion toward a second end, and wherein the assembly further comprises a locking element threadably engaging the threaded portion of the first fastener to press the first and second parts together.

4. The assembly of claim 1 wherein the first fastener further includes a first head portion toward a first end and a first engagement portion toward a second end, wherein the second fastener further includes a second head portion toward a third end and a second engagement portion toward a fourth end, and wherein the assembly further comprises:
    a first locking element engaging the first engagement portion of the first fastener to press the first and second parts together; and
    a second locking element engaging the second engagement portion of the second fastener to press the first and second parts together independently of the first fastener.

5. The assembly of claim 1 wherein the first fastener further includes a first head portion toward a first end and a first engagement portion toward a second end, wherein the second fastener further includes a second head portion toward a third end and a second engagement portion toward a fourth end, and wherein the assembly further comprises:
    a first locking element engaging the first engagement portion of the first fastener to press the first and second parts together; and
    a second locking element at least generally similar in structure and function to the first locking element, wherein the second locking element engages the second engagement portion of the second fastener to press the first and second parts together independently of the first fastener.

6. The assembly of claim 1 wherein the second fastener has a first end portion spaced apart from a second end portion, and wherein the assembly further comprises a spacer portion configured to support the first end portion of the second fastener, whereby the first end portion is longitudinally supported independently of the first fastener.

7. The assembly of claim 1 wherein the second fastener has a head portion toward a first end and an engagement portion toward a second end, and wherein the assembly further comprises a spacer portion supporting the head portion of the second fastener, whereby the head portion is longitudinally supported independently of the first fastener.

8. The assembly of claim 1 wherein the first fastener has a first head portion toward a first end and a first engagement portion toward a second end, wherein the second fastener has a second head portion toward a third end and a second engagement portion toward a fourth end, and wherein the assembly further comprises a spacer portion having a recess receiving one of the first head portion and the first engagement portion, the spacer portion supporting the second head portion of the second fastener so that the second head portion is longitudinally supported independently of the first fastener.

9. The assembly of claim 1 wherein the first part is a first aircraft part and the second part is a second aircraft part.

10. The assembly of claim 1 wherein the first part is a portion of an aircraft flap transmission and the second part is a portion of a flap track.

11. A method for attaching a first part to a second part, the method comprising:
    inserting a first fastener through a first hole in the first part and a second hole in the second part;
    placing the first fastener in tension to press the first part against the second part;
    inserting a second fastener through a third hole in the first fastener; and
    placing the second fastener in tension to press the first part against the second part independently of the first fastener, by means for preventing an axial load in the second fastener from being carried by any portion of the first fastener or any third part engaged with the first fastener, whereby the tension in the second fastener is carried by the first and second parts.

12. The method of claim 11, further comprising positioning a spacer over a first portion of the first fastener to support a second portion of the second fastener, whereby the second portion of the second fastener is longitudinally supported independently of the first fastener.

13. The method of claim 11, further comprising:
positioning a first spacer over a first portion of the first fastener to support a second portion of the second fastener, whereby the second portion of the second fastener is longitudinally supported independently of the first fastener; and
positioning a second spacer over a third portion of the first fastener to support a fourth portion of the second fastener, whereby the fourth portion of the second fastener is longitudinally supported independently of the first fastener.

14. A method for attaching a first part to a second part, the method comprising:
inserting a first fastener through a first hole in the first part and a second hole in the second part;
installing a first locking element on a first engagement portion of the first fastener;
tightening the first locking element to clamp the first and second parts together;
inserting a second fastener through a third hole in the first fastener;
installing a second locking element on a second engagement portion of the second fastener; and
tightening the second locking element to further clamp the first and second parts together, by means for preventing an axial load in the second fastener from being carried by any portion of the first fastener or any third part engaged with the first fastener, whereby the tension in the second fastener is carried by the first and second parts.

15. The method of claim 14, further comprising inserting the second fastener through a fourth hole in a spacer, wherein tightening the second locking element includes pressing the spacer against the first part.

16. The method of claim 14, further comprising inserting the second fastener through a fourth hole in a spacer, the spacer having a recess configured to receive the first locking element, wherein tightening the second locking element includes turning a nut against the spacer.

17. The method of claim 14, further comprising:
inserting the second fastener through a fourth hole in a first spacer, wherein tightening the second locking element includes pressing the first spacer against the first part; and
inserting the second fastener through a fifth hole in a second spacer, wherein tightening the second locking element includes pressing the second spacer against the second part.

* * * * *

UNITED STATES PATENT AND TRADEMARK OFFICE
CERTIFICATE OF CORRECTION

PATENT NO.       : 7,121,780 B2
APPLICATION NO.  : 10/971987
DATED            : October 17, 2006
INVENTOR(S)      : Charles B. Matich et al.

It is certified that error appears in the above-identified patent and that said Letters Patent is hereby corrected as shown below:

Title Page
Item [75], Inventors, please insert the following: -- Christopher D. Hartman --

Signed and Sealed this

Twenty-fifth Day of November, 2008

JON W. DUDAS
*Director of the United States Patent and Trademark Office*